United States Patent
Sugiyama et al.

(10) Patent No.: US 9,024,776 B2
(45) Date of Patent: May 5, 2015

(54) METHODS AND SYSTEMS FOR WELLHOLE LOGGING UTILIZING RADIO FREQUENCY COMMUNICATION

(75) Inventors: Hitoshi Sugiyama, Sagamihara (JP); Shinichiro Iso, Hachioji (JP); Satoru Umemoto, Kawasaki (JP); Miyako Kubota, Sagamihara (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 1402 days.

(21) Appl. No.: 11/855,164

(22) Filed: Sep. 14, 2007

(65) Prior Publication Data

US 2008/0068209 A1    Mar. 20, 2008

Related U.S. Application Data

(60) Provisional application No. 60/825,721, filed on Sep. 15, 2006.

(51) Int. Cl.
| | | |
|---|---|---|
| *G01V 3/00* | (2006.01) | |
| *E21B 47/12* | (2012.01) | |
| *G06K 7/00* | (2006.01) | |
| *G06K 7/10* | (2006.01) | |
| *H04L 29/08* | (2006.01) | |

(52) U.S. Cl.
CPC ............ *E21B 47/122* (2013.01); *G06K 7/0008* (2013.01); *G06K 7/10178* (2013.01); *H04L 67/125* (2013.01)

(58) Field of Classification Search
CPC ....................................................... G01V 3/00
USPC .............. 340/853.1, 853.2, 572.1; 166/255.1, 166/255.2, 65.1
See application file for complete search history.

(56) References Cited

U.S. PATENT DOCUMENTS

| | | | | |
|---|---|---|---|---|
| 3,905,010 | A | * | 9/1975 | Fitzpatrick ................. 340/854.4 |
| 4,696,631 | A | * | 9/1987 | Nitt ............................... 425/117 |
| 4,698,631 | A | * | 10/1987 | Kelly et al. ............... 340/853.1 |
| 5,142,128 | A | * | 8/1992 | Perkin et al. ................... 235/375 |
| 6,333,699 | B1 | | 12/2001 | Zierolf |
| 6,333,700 | B1 | | 12/2001 | Thomeer et al. |
| 6,536,524 | B1 | | 3/2003 | Snider |
| 6,759,968 | B2 | | 7/2004 | Zierolf |
| 6,885,308 | B2 | * | 4/2005 | Smith et al. ................. 340/854.6 |
| 6,915,848 | B2 | | 7/2005 | Thomeer et al. |
| 7,014,100 | B2 | * | 3/2006 | Zierolf .......................... 235/375 |
| 7,159,654 | B2 | * | 1/2007 | Ellison et al. ............ 166/250.01 |
| 7,230,542 | B2 | | 6/2007 | Smits et al. |
| 2002/0050930 | A1 | | 5/2002 | Thomeer et al. |
| 2002/0133942 | A1 | | 9/2002 | Kenison et al. |

(Continued)

FOREIGN PATENT DOCUMENTS

| | | |
|---|---|---|
| WO | 01/73423 | 10/2001 |
| WO | 01/92675 | 12/2001 |

(Continued)

*Primary Examiner* — Amine Benlagsir
(74) *Attorney, Agent, or Firm* — Daryl R. Wright; Wesley Noah

(57) ABSTRACT

A system and method is disclosed for utilizing a radio frequency communication system to wirelessly exchange data with well logging tools and external devices. A logging tool component is operably fitted with an extension antenna which travels through the thick casing of the logging tool. The extension antenna enables data exchange, for example, between radio frequency identification tags inside the logging tool and devices outside of the logging tool.

20 Claims, 5 Drawing Sheets

(56) References Cited

U.S. PATENT DOCUMENTS

| | | |
|---|---|---|
| 2002/0149498 A1 | 10/2002 | Tabanou et al. |
| 2002/0158120 A1 | 10/2002 | Zierolf |
| 2003/0090390 A1 | 5/2003 | Snider et al. |
| 2005/0150691 A1 | 7/2005 | Schultz et al. |
| 2005/0194134 A1* | 9/2005 | McGregor et al. ............ 166/264 |
| 2005/0230109 A1 | 10/2005 | Kammann et al. |
| 2005/0269083 A1* | 12/2005 | Burris et al. ............... 166/255.2 |
| 2007/0023185 A1* | 2/2007 | Hall et al. .................. 166/255.1 |
| 2007/0145129 A1* | 6/2007 | Perkin et al. .................. 235/385 |
| 2007/0199989 A1* | 8/2007 | Piety et al. .................... 235/438 |
| 2007/0285275 A1* | 12/2007 | Purkis et al. ............... 340/854.6 |
| 2008/0030365 A1* | 2/2008 | Fripp et al. ................. 340/853.1 |

FOREIGN PATENT DOCUMENTS

| | | |
|---|---|---|
| WO | 03/062588 | 7/2003 |
| WO | 03/067828 | 8/2003 |
| WO | 2006/041306 | 4/2006 |

\* cited by examiner

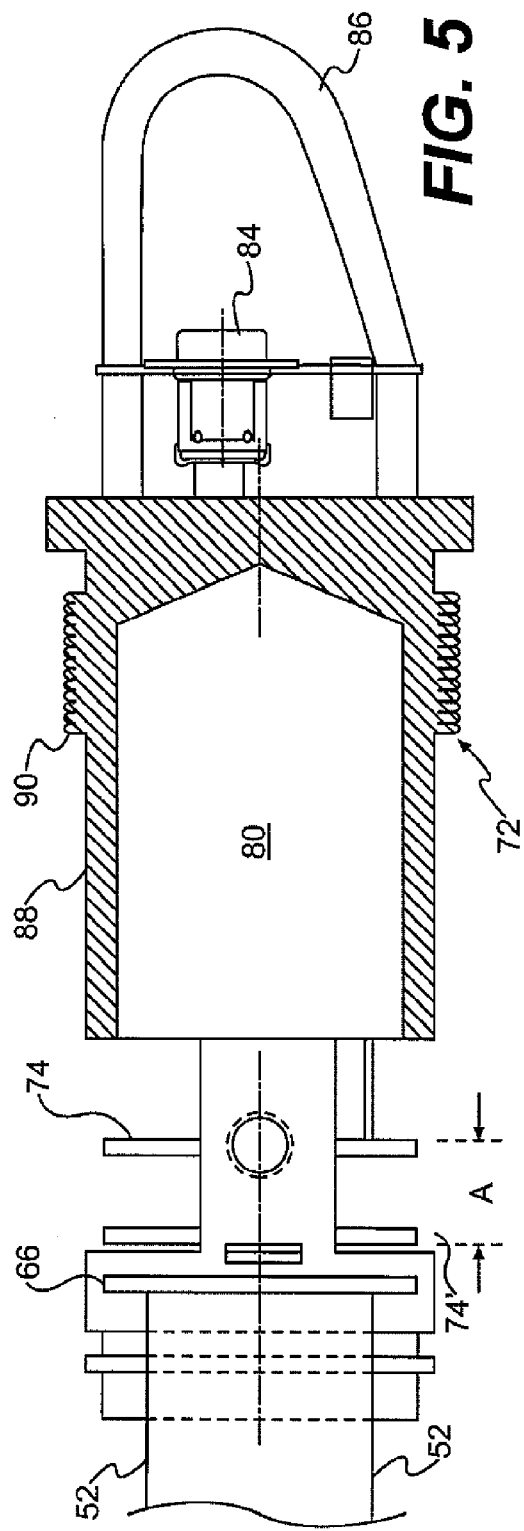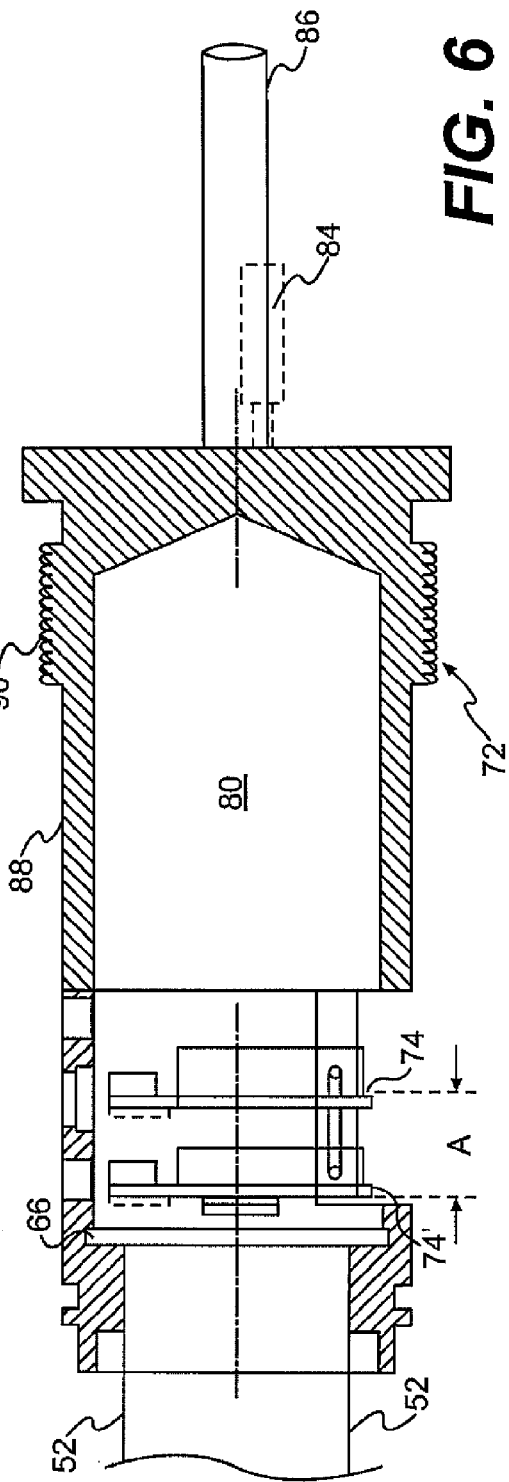

METHODS AND SYSTEMS FOR WELLHOLE LOGGING UTILIZING RADIO FREQUENCY COMMUNICATION

CROSS-REFERENCE TO RELATED APPLICATION

This application relates to and claims the benefit under 35 U.S.C. §119(e) of applicants' U.S. Provisional Application Ser. No. 60/825,721 entitled "Methods and Systems Utilizing Devices With Radio Frequency Communication Capabilities," filed Sep. 15, 2006. The disclosure of this Provisional Application is hereby incorporated by reference as though set forth at length.

TECHNICAL FIELD

The present invention relates to the field of wellhole logging and radio frequency data communication systems. More particularly, this invention relates to communication systems to collect data from oil well sonde tools used in well logging programs. The data collected can be associated with any aspect of the drilling or production operations and the physical, chemical and structural properties of penetrated geological formations. In a related aspect, the invention is directed to sonde tool component management and to preventative maintenance system support.

BACKGROUND OF THE INVENTION

Oilfield drilling operations are complex and require an accumulation of as much drilling information as possible about formation stratigraphy, lithology and mineralogy. Such information is acquired by scientists and oilfield engineers through real time and historic well logging programs using both wireline logging and measurements-while-drilling (MWD).

Wireline Logging

In wireline logging, measurements are recorded using wireline logging tools, or sondes, which are lowered into the open wellbore on a wireline. These logging tools typically comprise a sonde section which contains a variety of measurement sensors and a cartridge section, at the upper end, which contains electronics and power supplies. Wireline logging tools can be lowered into a well hole between drill string trips, preproduction following drilling operations and during production.

Specific sonde components per se are rather sophisticated sampling and electronic devices that are often assembled into a combination of three or more tools arranged in series. Some examples known in the art are phasor dual induction spherically focused resistivity sondes, litho-density sondes and gamma ray sondes. Also, there are temperature, acceleration and pressure sondes. Specific sondes vary in length but are usually six feet to thirty feet and operate downhole under a wide range of pressures, temperatures and depths.

Monopole, dipole and quadrupole sonic logging tools are used to measure compression, shear and Stoneley waves which can be used to determine well formation attributes and lithology characteristics. Sondes vary widely in length, diameter and weight. For example, the sondes described above may be fifty feet in length approximately 3.6 inches in diameter and can weight 900 pounds. In other instances production sondes may be smaller, such as 1 and $11/16$ inches in diameter, or even smaller, for some applications to pass borehole restrictions related to equipment for oil and gas production control (safety valves, production packers, downhole flow control and monitoring equipment).

The above logging tools can use a variety of specialty sondes such as an azimuthal resistivity imager for quantitative evaluation of laminated forms, fracture formations, formation dips and borehole profiles.

In a typical wireline logging operation a logging tool is assembled and tested by an engineer in the oilfield, delivered to a drilling derrick and lowered to the bottom of a well on a wireline. The wireline tool is then drawn up the borehole and sampling is performed, typically every 15 centimeters or so, as the tool is raised. In general, well logging has either a scientific or technical program associated with the logging run and uses acoustic, nuclear and/or electrical measurement techniques to record data and/or information that permits scientists to access information such as resistivity, velocity, density, porosity, gamma ray, geochemistry, imaging, vertical seismic profile, temperature and pressure measurements and borehole drilling parameters. Some of this information is transmitted to the surface via an electrical wire or fiber optic cable on a real time basis.

Measurements-while-Drilling

In addition to wireline logging, similar downhole measurements can be obtained using measurements-while-drilling (MWD) tools. These tools are appropriate under certain conditions. For example, highly deviated wellbores are difficult and time consuming to measure with conventional wireline tools. In these cases, MWD tools typically use less rig time and thus save costs. Evaluation of physical properties such as pressure, temperature and wellbore trajectory in three-dimensional space and other borehole characteristics are typical measurements taken using MWD procedures. MWD is now standard practice in many instances such as drilling offshore directional wells.

MWD tools can deliver data to the surface immediately, (i.e. by digitally encoding data and transmitting it as pressure pluses in the mud system). Alternatively, MWD tools can store the data for later retrieval when connected to an electrical wire or, if the data link fails, when the tool is tripped out of the hole.

MWD tools that measure formation parameters such as resistivity, porosity, sonic velocity, gamma ray, etc. of a formation are sometimes known as logging-while-drilling (LWD) tools. In the present invention, however, the terms MWD and LWD are used interchangeably. These tools are often imbedded within the side walls of a section of drill pipe above a drill bit and transmit a certain amount of information to the surface on a real time basis or at least during bit replacement trips.

Logging Tool Management and Data Transfer.

Prior to performing the exemplary operations discussed above, an oilfield engineer must insure that the proper tools are brought on site. This is can be a significant logistical challenge. The site operator must not only keep track of the types and number of these tools, but also record other parameters relating to these tools. Logging tools are run through diagnostic tests and are calibrated. The results of these operations are recorded. Also, hopefully, the usage history of these tools will be logged. Each tool has a particular "useful life" or "lifetime" whose length depends on the hours and conditions under which the tool has been in service. In order to avoid an unacceptable failure rate or catastrophic failure, the tools must be repaired or retired after they reach a statistically determined useful lifespan.

Logging tools are typically fabricated with high strength steel walled cylinders that are capable of withstanding the high abrasion, high pressure and high temperature working environment that exists within a borehole twenty five thousand feet, or so, beneath the surface of the earth. Consequently the data inside the tools is not easily accessed. Even when the data is sought after the tools are brought to the surface, data inside the tools must be accessed through some sort of communication port drilled through the walls of the cylinder. These ports can be a hole in the cylinder side wall through which a connector is inserted and attached to internal data processing equipment. Data is downloaded with telemetry tools, and surface acquisition systems. Setup and supply of power is needed in order to start the data acquisition. This, in turn requires the connection among the tools and the various other telemetry equipment and power supplies with numerous wires and cables.

This data acquisition requires a significant amount of time and effort. Users of the tool string need to confirm all of the diagnostics and calibration status, before shipping the tools to the well site. This may require a few hours in order to just confirm the status and require an expensive surface acquisition system.

One system known in the past that has been designed to facilitate logging tool management and data transfer is disclosed in Smits et al. U.S. Pat. No. 7,230,542, assigned to Schlumberger Technology Corporation, of common assignment as the subject application. The disclosure of this Smits et al. '542 patent, and the prior art cited therein, is incorporated here by reference as though set forth at length. Briefly, however, the '542 patent discloses use of a modular memory cylinder that is plugged into a lateral bore through the side wall of a logging tool. When the tool is raised to the surface the memory module is physically removed from a lateral position within the side wall of the logging tool and a new memory module is put in its place. This newly loaded module is configured with parameters and data related to the tool configuration for the next run.

Although the above noted electronic management and logging tool data retrieval system is a significant advance in the art, it requires the presence of a lateral access port through which the memory modules can be removed. The present invention is yet a her advance which eliminates much of the time and effort required in setting up and collecting well logging and sonde data.

Brief Summary of Aspects of the Invention

Methods and systems disclosed herein allow access to logging tool data, without having to physically connect the tool to a power supply, telemetry equipment, and acquisition system for acquiring the tool data.

Oilfield tools are packaged in thick walled steel pressure tight housings or casings. In some embodiments of the current invention, integrated circuit board devices, placed inside of the metal casings, have silicon chips and antennas to enable storing of data in a buffer and to enable reception of and response to radio-frequency queries. Such devices are referred to here as Radio Frequency Identification Tags (RFTags) and are designed for wireless communication. Although wireless communication is not usually possible through thick walled steel cylinders, an extension antenna enables communication axially through the end of the logging tool so that data may be exchanged to and from RFTags located within the tools by an exterior radio frequency pickup.

RFTags mounted inside of the casing can receive data relating to, for example, temperature, pressure, and other measurements that are made downhole or elsewhere. In this, the present disclosure contemplates transmission of various types of data that are commonly stored and used by tools of the type described herein. Several printed circuit boards (PCBs) are typically present inside the tool casing. RFTags can also be mounted on these PCBs and receive data from the PCB.

These data received from the RFTags are then placed in two-way communication with an antenna portion extending exterior to an end of the cartridge and thus in operative communication with wireless external communication devices.

Typical communication devices include a radio frequency antenna circuit, an RFID reader-writer antenna, a transceiver and a second radio frequency antenna (e.g. BLUETOOTH antenna or wireless LAN antenna).

In one embodiment a smart end cap is mounted at the end of a logging tool component, such as a wireline cartridge. This end cap includes an antenna, a transceiver and a BLUETOOTH or wireless LAN antenna which projects outside of the end of the smart end cap. In response to radio frequency (RF) queries, the data is broadcast by RF and received by external devices for processing. The external devices may be hand held devices that are designed to query and receive data from multiple RFTags.

THE DRAWINGS

Other aspects of the present invention will become apparent from the following detailed description of embodiments taken in conjunction with the accompanying drawings wherein.

Figure 4:
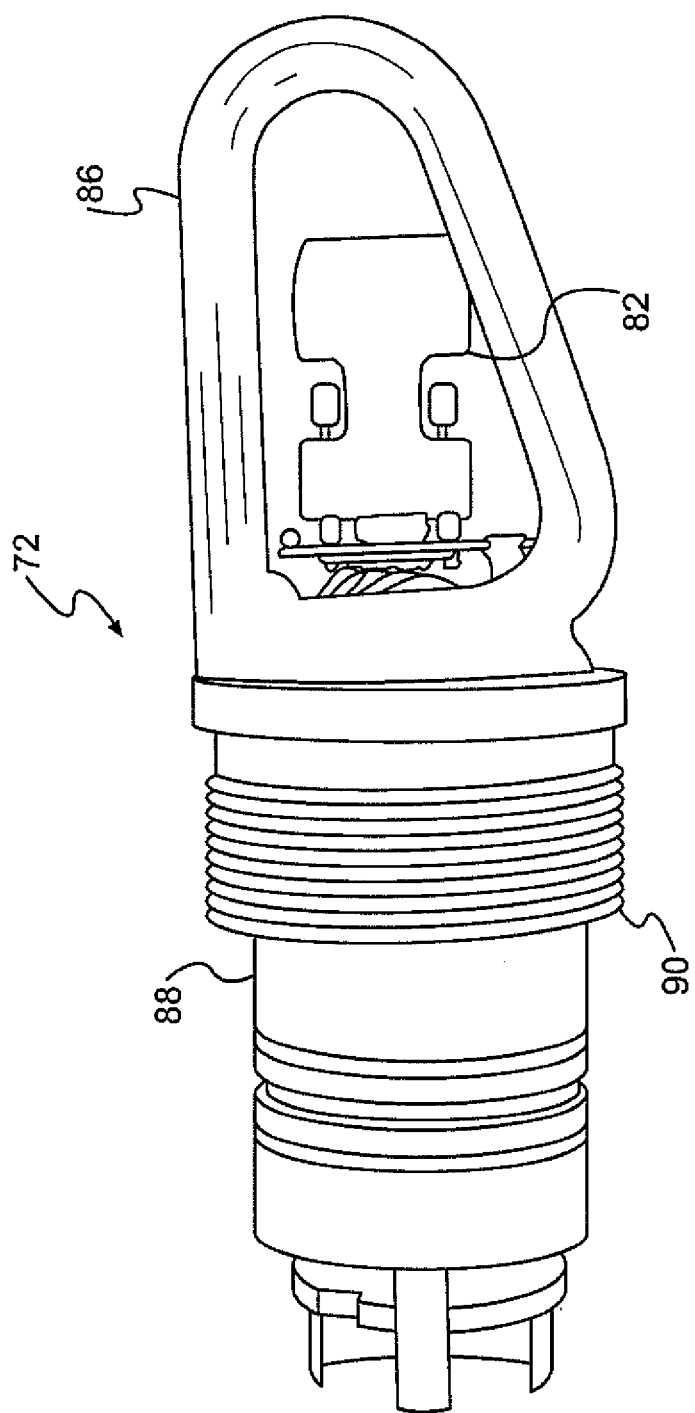
FIG. 4 is an axonometric view of a smart end cap for a logging tool in accordance with the invention that includes an internal transceiver and an external radio frequency antenna that axially projects within a protective bail at a free end of the end cap.

FIGS. 5 and 6 disclose partial cross-sectional views of the smart end cap illustrated in FIG. 4 to illustrate relevant interior details.

Figure 7:
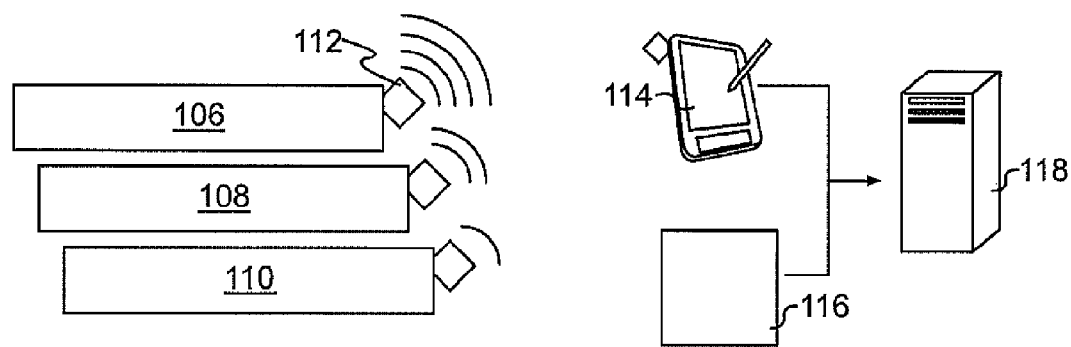

FIG. 7 is a system schematic of a number of racked logging tools being queried and/or instructed by a hand held radio frequency transceiver for direct or indirect link to a data storage computer and processor.

Figure 8:
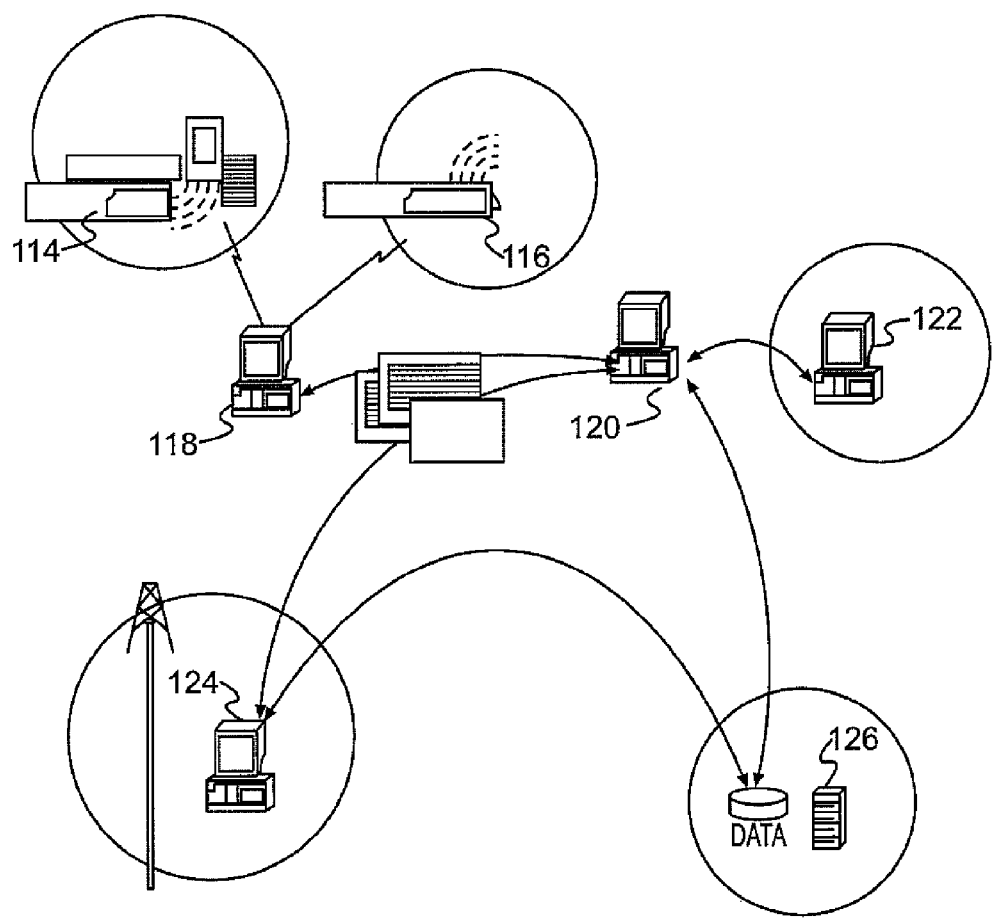

FIG. 8 is a schematic system representation of a network suitable to record and process well logging and well logging instrument data and instructions.

DETAILED DESCRIPTION

Context of the Invention

Figure 1:
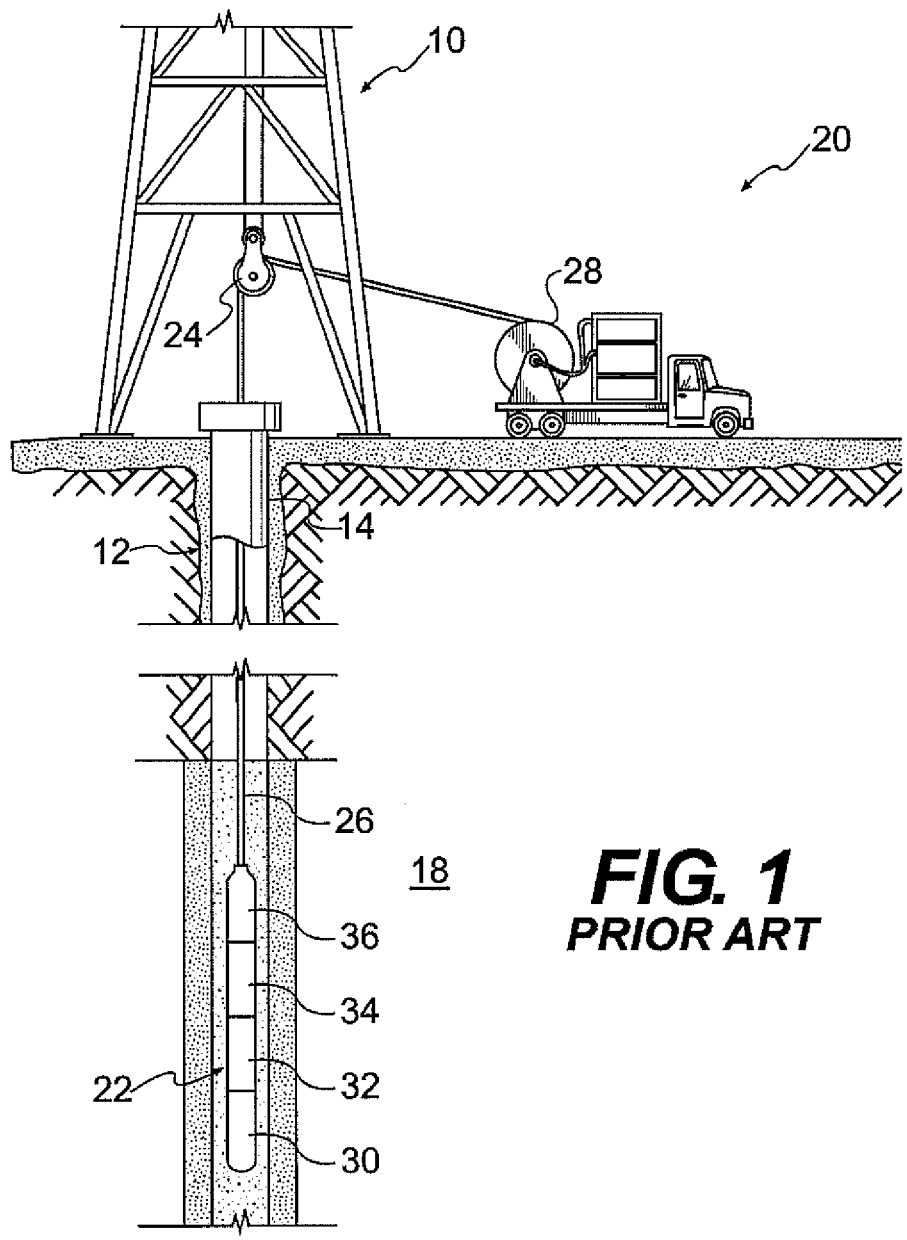
FIG. 1 illustrates one schematic operating context of the invention of a service vehicle that is used to carry a wireline reel to a wellhole for lowering a logging tool into a well and recording data at the surface during and/or following a well logging program.

Turning now to the drawings where like numerals indicate like parts, FIG. 1 illustrates one example of an operating context of the subject invention. In this a conventional oil well drilling derrick 10 is shown positioned above an oil well borehole 12 that has been drilled into the earth. A casing 14 has been installed at the top of the bore hole and is cemented in place. The borehole may extend thousands of feet into the earth's crust such as 25,000 feet into an oil bearing formation 18. Operational pressures at this depth may be 20,000 pounds per square inch with temperatures in the range of 150 to 175°

C. In addition, the borehole is filled with drilling fluid or mud which has a corrosive particulate characteristic.

Notwithstanding such a harsh operating environment, scientists need to make scientific and technical borehole measurements and record significant quantities of formation and borehole data to insure a successful drilling operation and subsequent production of oil and/or gas from a subterranean formation.

In order to accomplish this data collection a well logging service vehicle 20 is driven to the site and delivers a logging tool 22 which is lowered via the derrick 10 and a traveling block 24 into the borehole suspended from a wireline 26. The wireline is paid out from a reel typically mounted on the service vehicle 20. The surface vehicle also usually carries data memory and computer processing to examine certain down hole well data on a real time basis.

The logging tool 22 is often composed of a triple or a combination of three tools 30, 32 and 34 which are selected by scientists to perform a variety of functions as discussed above. At the top of the logging tool 22 is a cartridge 36 which carries electronic components on PCBs and a power supply for the various tool functions.

In operation the logging tool 22 is lowered down to a production formation 18 and then withdrawn taking incremental measurements as the tool is raised toward the surface. Critical real time data can be delivered via the wireline or a fiber optic cable to the service vehicle 20 for immediate processing.

As explained above, however, it is often appropriate to use, for example, MWD tools in which data is recorded and stored within the tool casing. This data is retrieved from the tool, in response to a query, at the surface after the tool has been withdrawn. It is this system and process for recording and remotely and facilely accessing and retrieving high volumes of borehole and formation data that is the general subject of the instant invention.

Radio Frequency Data Communication

Figure 2:
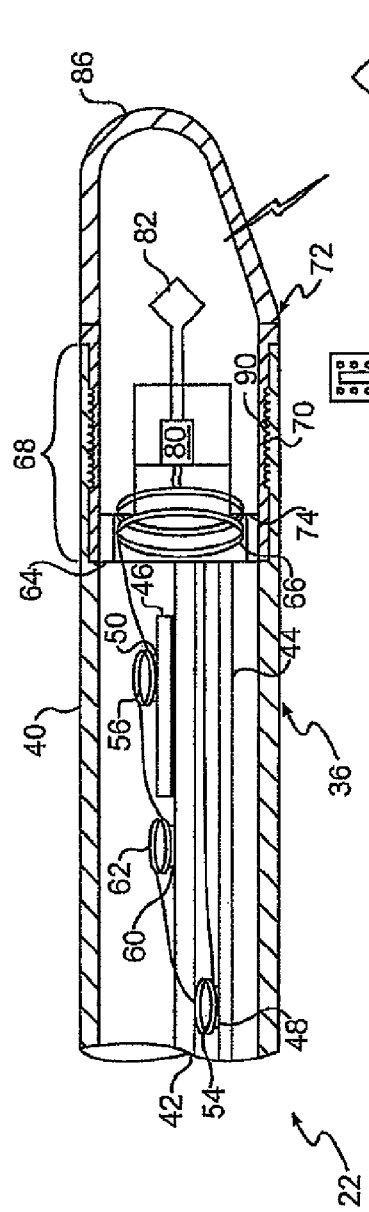
FIG. 2 illustrates a simplified schematic representation of a passive radio-frequency identification (RFID) system mounted within an upper end of a well logging tool.
Figure 3:
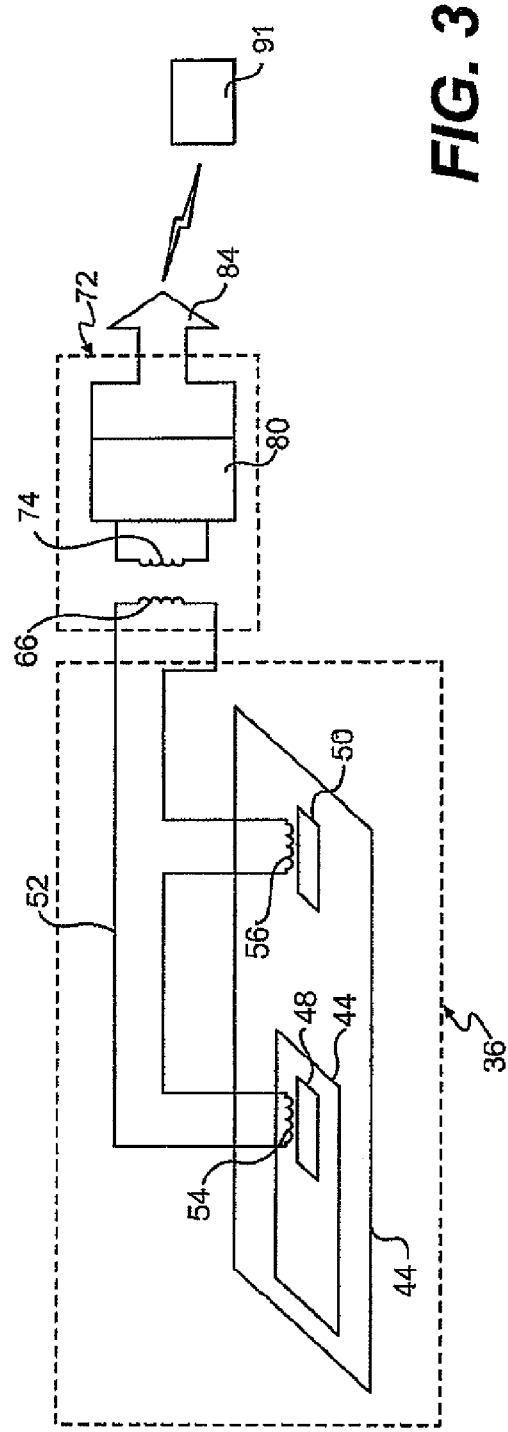
FIG. 3 is an electrical schematic of the passive RFID system shown in FIG. 2.

Referring now to FIGS. 2 and 3, and as previously noted, a well logging tool 22 includes one or more components 36. The component 36 like other portions of the logging tool is fabricated with a high strength metal cylinder housing 40. A chassis 42 is mounted longitudinally within the cartridge cylinder and a plurality of PCBs 44 and 46 are supported on the chassis 42.

Integrated circuit based devices, such as radio frequency identification (RFID) tags 48 and 50, having silicon chips, enable storing data in a buffer and exchange radio-frequency communication with an RFID transceiver. Unfortunately, in a logging tool environment it is necessary that the tool is encased within a cylinder of high strength steel 40 to function downhole and radio frequency communication is not feasible through such thick walled steel cylinders.

The subject invention addresses this transmission limitation by the provision of an internal antenna circuit 52 (note particularly FIG. 3) which may be passive, and without an independent power source, or active with its own source of power within the circuit (not shown here). The antenna circuit 52 includes a series of antennas 54 and 56 positioned adjacent to the radio frequency identification tags 48 and 50. Loop induction antennas preferably couple the radio frequency identification tags to the internal antenna circuit, although other antenna configurations are envisioned. With the loop antennas 54 and 56 positioned directly adjacent to the radio frequency identification tags noise and interference is limited, even in low power applications.

In addition to the loop antennas positioned adjacent to the radio frequency identification tags on the printed circuit boards, a radio frequency identification tag 60 is mounted on the logging tool chassis 42. This radio frequency identification tag 60 in turn is coupled to the antenna circuit 52 by a loop antenna 62.

The internal antenna circuit 52 extends to a forward end 64 of the logging tool component 36 and extends through the end of the logging tool component into an induction loop antenna 66 outside of the tool casing 36. The tool component 36 has an extended section 68 which has internal threads 70 at an open end. The open end of the tool component is in turn operable to intimately receive a smart end cap 72. The smart end cap internally carries an active induction antenna loop 74 which opposes or is in parallel with the induction loop antenna 66. The antenna loop 74 is connected to a transceiver 80 which provides a reader-writer function to read data from the component antenna loop 66 and transmit data to the component antenna loop 66 from an external source.

A farther antenna 82 extends out of the smart end cap and may be, generally speaking, a wireless LAN antenna as illustrated in FIG. 2 or a BLUETOOTH antenna 84 as shown schematically in FIG. 3. A heavy duty handle or bail 86 extends in a general longitudinal direction and surrounds the exterior antenna (note particularly FIGS. 4-6).

As illustrated in FIG. 2, the exterior wireless LAN antenna 82 may operably connect to a relay station 91 which in turn is connected to a server 92. In FIG. 3, the exterior BLUETOOTH antenna 84 wirelessly connects with a personal computer or relay station 91 to record and/or send data to the transceiver 80.

Turning now more specifically to FIGS. 4-6 there will be seen various views of a smart end cap 72 as discussed above. As seen the smart cap has a cylindrical body 88 which is operable to be received snuggly within an open end 68 of the component 36 of a logging tool 22. The smart end cap 72 is fashioned with external treads 90 which cooperate with the internal threads 70 of the open end of the component 36. The transceiver 80 is mounted within the smart end cap 72 and connects to the loop induction antenna 74 which is mounted within the smart end cap such that it can be longitudinally adjusted by a distance "A"—and thus move from position 74 incrementally to position 74'. This changes the position of antenna 74 with respect to the opposing induction loop 66 from the antenna circuit 52 of the logging tool component 36. This adjustment capacity permits an oilfield engineer to adjust the coupling intensity between the two opposing antennas 66 and 74.

FIG. 7 illustrates collection of data from several RFTaged tools 106, 108, 110 at the same time. This data can be collected from the tools in either active or passive internal antenna circuit modes. The data can collected by a variety of devices. Two examples are illustrated here, a hand held reader-writer 114 or an intelligent container system 116 that retrieves data as the tools pass a terminal or warehouse gate. After receipt, the data is transferred to a storage device 118 such as a computer hard drive.

The invention is also designed to be integrated into a wider scope of oilfield operations. An example is illustrated in FIG. 8. This schematic figure illustrates data reception from a hand held device 114 or intelligent container system 116 and data storage 118. The data can then be added to a network 120 and utilized as part of a replacement manufacturing production system 122 which integrates the other systems shown. FIG. 8 also illustrates gathering of geologic data 124, for example, with a surface acquisition system (not shown) as well as other data storage and processing 126.

Taken together, the various systems illustrated in FIG. 8 increase oilfield operation efficiency. For example, sensors inside tools can measure environment conditions for each PCB and store this information in RF tags. These data can then be retrieved by the intelligent container system, transmitted to the data storage and be analyzed by the replacement manufacturing production system, which estimates the lifetime of each type of PCB within the tool, thereby providing true-life time of tool parts or PCBs. Such information provides better tool management since tool replacement and servicing is improved, as is tool inventory management.

Loop antennas made of, for example, wire are located adjacent to each RFTag and an extension antenna provides a transmission link so that RFTag positioning is not necessary to align with the reader-writer antenna. The loops may be connected with twisted pair cable. The antenna extension may be made with suitable wire so as to make it withstand high temperatures and pressure.

The number of loop antennas is not limited. More than two loops can be located for communication with multiple RFTags simultaneously by using anti-collision RFTags and, as discussed above, precise orientation of the RFTags and reader-writer antenna is not required by use of the extension antenna. Multiple RFTags may be located on a single loop of extension. Only two conductors are required to go through the metal bulkhead of the housing resulting in a system having a simple design.

Methods are provided for real-time tracking and monitoring of tools so that tool utilization is optimized, and job down time by tool hardware trouble during logging is decreased. Other applications include asset management; tool tracking and monitoring; improvements in tool reliability; tool quality control; operational cost savings; manufacturing process management.

Also disclosed herein are mechanisms for assessing hardware diagnostics status and tool operation history without connecting the tools, supplying power to the tools, or setting up any surface acquisition systems. Hardware information and tool operation history data is stored on the RFTags during acquisition of the data, and end users are able to access the latest and historical data directly from the RFTag's wireless interface. As a consequence, operation down time is drastically reduced, from several hours down to less than a few minutes because telemetry systems and acquisition systems do not need to be set up.

Tool data, such as hardware equipment information including diagnostics results, tool operation history, as well as tool and tool part identification data may be accessed at any time by storing the data on RFTags, which are mounted on the tool with the component electronics (as depicted in FIGS. 2-3). A suitable reader-writer may be used to carry out direct and wireless access of the tool data.

The various aspects of the invention were chosen and described in order to best explain principles of the invention and its practical applications. The preceding description is intended to enable others skilled in the art to best utilize the invention in various embodiments and aspects and with various modifications as are suited to the particular use contemplated. For example, the above loop antenna may be replaced with a dipole antenna or other antennas known in the prior art. It is intended that the scope of the invention be defined by the following claims.

What is claimed is:

1. A system for transferring data in a direction of at least one of to and from a well logging tool having an exterior metal shell operable to protect components of the well logging tool in a downhole environment, said system for transferring the data comprising:
the well logging tool for measuring the data relative to at least one of said well logging tool and subsurface properties of a well, said well logging tool including,
a logging tool casing;
at least two internal antennas electrically coupled together and housed in an interior of the logging tool casing for wireless communication with the components within the logging tool casing, wherein the at least two internal antennas are connected to radio frequency identification tags housed in the interior of the logging tool casing, and the at least two internal antennas are operable to exchange the data between said radio frequency identification tags and a loop induction antenna mounted outside of the interior of the logging tool casing within the well logging tool;
a chassis positioned longitudinally within a cartridge section of said well logging tool wherein said radio frequency identification tags are connected to said chassis;
a smart end cap closed at an end of the well logging tool and removably connected to said well logging tool for protection of said well logging tool;
a reader-writer antenna positioned close and oppose to the loop induction antenna such that the data can be exchanged between the loop induction antenna and the reader-writer antenna;
a transceiver connected to said reader-writer antenna mounted within the smart end cap operable to exchange the data with said reader-writer antenna from said reader-writer antenna to an external antenna;
the external antenna positioned outside of the interior of the logging tool casing within the well logging tool, wherein the external antenna is extending out of said smart end cap and communicatively coupled to the at least two internal antennas to allow transfer of the data, through said external antenna, between said at least two internal antennas and an external device located outside the well logging tool;
a bail connected to an end of said smart end cap and extending over said external antenna;
said data is collected and recorded by at least one sensor located in said smart end cap, said at least one sensor configured to measure the downhole environment to which the well logging tool is exposed when tripped out of a hole; and
the loop induction antenna mounted within the smart end cap to be adjusted by a distance, wherein the adjustment distance of the loop induction antenna permits adjustments of a coupling intensity between the reader-writer antenna and the loop induction antenna.

2. The system for transferring the data as defined in claim 1 wherein
said external antenna protrudes from the end of said well logging tool.

3. The system for transferring the data as defined in claim 1 wherein:
one of the at least two internal antennas is connected to one of said radio frequency identification tags which is located on a printed circuit board and is operable to exchange the data between said printed circuit board and said external device.

4. The system for transferring the data as defined in claim 3 further comprises:
a plurality of printed circuit boards positioned within said well logging tool.

5. The system for transferring the data as defined in claim 1 wherein said radio frequency identification tags connected to each of a plurality of printed circuit boards and said chassis.

6. The system for transferring the data as defined in claim 1 wherein one of the at least two internal antennas further comprises:
a passive antenna circuit.

7. The system for transferring the data as defined in claim 1 wherein said reader-writer antenna further comprises:
a device for exchanging information with said radio frequency identification tags, said device including a power source to power said information exchange.

8. The system for transferring the data as defined in claim 1 wherein said external antenna further comprises:
a wireless LAN antenna or a BLUETOOTH antenna.

9. The system for transferring the data as defined in claim 1 wherein:
said at least one sensor further comprises one or more of a temperature sensor, a pressure sensor, an acceleration sensor, or a sensor designed to monitor the transportation conditions of the well logging tool.

10. The system for transferring the data as defined in claim 1 wherein:
one of the at least two internal antennas is part of said radio frequency identification tags which is designed to collect geologic data from said well logging tool.

11. The system for transferring the data as defined in claim 10 wherein said radio frequency identification tags are further designed to collect data associated with, identification of plurality of printed circuit boards or said chassis;
said data associated with said identification of said plurality of printed circuit boards or said chassis comprises information on diagnostics results of said plurality of printed circuit boards or said chassis.

12. The system for transferring the data as defined in claim 1 wherein: the external device is another well logging tool inside the downhole environment through which the data are relayed uphole.

13. The system for transferring the data as defined in claim 1 wherein: the external device is a reader-writer for collecting the data wirelessly and is outside the downhole environment.

14. A system for transferring data in a direction of at least one of to and from an identification tag of at least one radio frequency identification tag within an interior of a logging tool metal casing of a logging tool to a device outside of the logging tool comprising:
the at least one radio frequency identification tag housed in the interior of the logging tool casing within the logging tool;
a chassis positioned longitudinally within a cartridge section of said logging tool wherein said at least one radio frequency identification tag is connected to said chassis;
at least one extension antenna configured to exchange the data between said at least one radio frequency identification tag and an induction loop antenna mounted outside of the interior of the logging tool casing within the logging tool,
a smart end cap is removably connected to one end of said logging tool for protection of said logging tool;
a reader-writer antenna positioned close and oppose to the induction loop antenna such that the data can be exchanged between the induction loop antenna and the reader-writer antenna;
a transceiver connected to said reader-writer antenna mounted within the smart end cap operable to exchange the data with said reader-writer antenna from said reader-writer antenna to an external antenna;
the external antenna positioned outside of the interior of the logging tool casing within the logging tool, wherein the external antenna extending out of said smart end cap and being operable to exchange the data from within the interior of the logging tool to the device outside of the logging tool;
a bail connected to an end of said smart end cap and extending over said external antenna;
said data is collected and recorded by at least one sensor located in said smart end cap, said at least one sensor configured to measure an environment to which the logging tool is exposed when tripped out of a hole; and
the induction loop antenna is mounted within the smart end cap to be adjusted by a distance, wherein the adjustment distance of said induction loop antenna permits adjustments of a coupling intensity between the reader-writer antenna and the induction loop antenna.

15. The system for transferring the data as defined in claim 14 wherein said external antenna further extends longitudinally out of said smart end cap and comprises:
a wireless LAN antenna and said device outside of said logging tool comprises a LAN.

16. The system for transferring the data as defined in claim 14 wherein said logging tool is a wireline tool.

17. The system for transferring the data as defined in claim 14 wherein said logging tool is a drilling-and-measuring (D&M) tool.

18. A method for exchanging data from a closed interior area formed within a logging tool metal casing of a well logging tool to a device located outside of the well logging tool comprising:
storing the data received on at least one radio frequency identification tag housed inside the closed interior of the logging tool casing;
positioning a chassis longitudinally within a cartridge section of said well logging tool wherein the at least one radio frequency identification tag is connected to said chassis;
using an antenna circuit to exchange the data wirelessly inside the closed interior of the logging tool casing from said at least one radio frequency identification tag to the antenna circuit and communicating the data to a first induction loop antenna located outside of the closed interior of the logging tool casing within the well logging tool;
using a second induction loop antenna communicatively proximate and oppose to the first induction loop antenna so that the data can be exchanged between the two induction loop antennae, wherein the second induction loop antenna is mounted within a smart end cap, and the smart end cap is removably connected to said well logging tool;
using a transceiver connected to said second induction loop antenna to exchange the data from the second induction loop antenna to an external antenna;
using the external antenna extending out of said smart end cap within the well logging tool and being operable to exchange the data to the device outside of the well logging tool, wherein said data is collected and recorded by at least one sensor located in said smart end cap, said at least one sensor configured to measure an environment to which the well logging tool is exposed when tripped out of a hole;
using a bail connected to an end of said smart end cap and extending over said external antenna; and
using at least one of the loop induction antennas mounted within the smart end cap to be adjusted by a distance, wherein the adjustment distance of the at least one of the loop induction antennas permits adjustments of a coupling intensity between the second induction loop antenna and the first induction loop antenna.

19. The method for exchanging the data as defined in claim 18 further comprising the step of:
using energy from the transceiver for powering the antenna circuit for exchanging the data between the transceiver and the at least one radio frequency identification tag inside the well logging tool.

20. The method for exchanging the data as defined in claim 18 further comprising:
using a second antenna connected to the antenna circuit in order to allow communication with a second radio frequency identification tag provided in the closed interior of the logging tool casing.

* * * * *